(12) United States Patent
Cameron

(10) Patent No.: US 11,943,179 B2
(45) Date of Patent: *Mar. 26, 2024

(54) SYSTEMS AND METHODS FOR GENERATING AND PRESENTING GRAPHICAL USER INTERFACES

(71) Applicant: Asana, Inc., San Francisco, CA (US)

(72) Inventor: David Cameron, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,289

(22) Filed: Mar. 30, 2023

(65) Prior Publication Data

US 2023/0239261 A1    Jul. 27, 2023

Related U.S. Application Data

(63) Continuation of application No. 17/526,756, filed on Nov. 15, 2021, now Pat. No. 11,652,762, which is a
(Continued)

(51) Int. Cl.
*H04L 51/04* (2022.01)
*G06Q 50/00* (2012.01)
(Continued)

(52) U.S. Cl.
CPC ............. *H04L 51/04* (2013.01); *G06Q 50/01* (2013.01); *H04L 51/216* (2022.05); *H04L 51/52* (2022.05)

(58) Field of Classification Search
CPC ......... H04L 51/04; H04L 51/16; H04L 51/52; G06Q 50/01
See application file for complete search history.

(56) References Cited

U.S. PATENT DOCUMENTS

| 5,233,687 A | 8/1993 | Henderson, Jr. |
| 5,524,077 A | 6/1996 | Faaland |

(Continued)

FOREIGN PATENT DOCUMENTS

| CN | 101305350 A | 11/2008 |
| CN | 101563671 A | 10/2009 |

(Continued)

OTHER PUBLICATIONS www.cogmotive.com/blog/author/alan Alan Byrne: "Creating a company Shared Calendar in Office 365"; pp. 1-17; Sep. 10, 2013 (16 pages).

(Continued)

*Primary Examiner* — Mohamed A. Wasel
(74) *Attorney, Agent, or Firm* — Esplin & Associates, PC

(57) ABSTRACT

Systems and methods for presenting graphical user interfaces corresponding to users and including portions of one or more chat sessions the users are participants in, the chat sessions facilitating synchronous textual communication between the users that takes place through a chat system are disclosed. Some implementations may: obtain chat information characterizing participants in the chat sessions; and effectuate presentation, responsive to receiving user input indicating a selection of the first user by the second user, of a first graphical user interface corresponding to the first user via a client computing platform associated with the second user.

20 Claims, 4 Drawing Sheets

Related U.S. Application Data continuation of application No. 16/837,306, filed on Apr. 1, 2020, now Pat. No. 11,212,242, which is a continuation of application No. 16/163,395, filed on Oct. 17, 2018, now Pat. No. 10,616,151.

(51) Int. Cl.
*H04L 51/216* (2022.01)
*H04L 51/52* (2022.01)

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,676,792 B1 | 3/2014 | Scatamacchia |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,645,994 B2 | 5/2017 | Agarwal |
| 9,674,361 B2 | 6/2017 | Ristock |
| 9,712,576 B1 | 7/2017 | Gill |
| 9,715,496 B1 | 7/2017 | Sapoznik |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,728,199 B2 | 7/2020 | Grochocki, Jr. |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B2 | 12/2021 | Sabo |
| 11,212,242 B2 * | 12/2021 | Cameron ............ H04L 51/216 |
| 11,263,228 B2 | 3/2022 | Koch |
| 11,288,081 B2 | 3/2022 | Sabo |
| 11,290,296 B2 | 3/2022 | Raghavan |
| 11,310,294 B2 * | 4/2022 | Faulkner ............ H04N 7/15 |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |

(56) References Cited

U.S. PATENT DOCUMENTS

| | | |
|---|---|---|
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0042263 A1 | 2/2012 | Rapaport |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0303614 A1 | 11/2012 | Mercuri |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0185361 A1 | 7/2013 | Balasubramanian |
| 2013/0198618 A1 | 8/2013 | Tanzer |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0275519 A1 | 10/2013 | Nichols |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Taber |

(56) References Cited

U.S. PATENT DOCUMENTS

| | | | |
|---|---|---|---|
| 2014/0040780 A1 | 2/2014 | Artzt | |
| 2014/0040905 A1 | 2/2014 | Tadanobu | |
| 2014/0058801 A1 | 2/2014 | Deodhar | |
| 2014/0059910 A1 | 3/2014 | Norton | |
| 2014/0074536 A1 | 3/2014 | Meushar | |
| 2014/0089719 A1 | 3/2014 | Daum | |
| 2014/0101310 A1 | 4/2014 | Savage | |
| 2014/0156539 A1 | 6/2014 | Brunet | |
| 2014/0165001 A1 | 6/2014 | Shapiro | |
| 2014/0172478 A1 | 6/2014 | Vadasz | |
| 2014/0189017 A1 | 7/2014 | Prakash | |
| 2014/0200944 A1 | 7/2014 | Henriksen | |
| 2014/0208325 A1 | 7/2014 | Chen | |
| 2014/0215344 A1 | 7/2014 | Ligman | |
| 2014/0229609 A1 | 8/2014 | Wong | |
| 2014/0236663 A1 | 8/2014 | Smith | |
| 2014/0244334 A1 | 8/2014 | De | |
| 2014/0257894 A1 | 9/2014 | Melahn | |
| 2014/0279294 A1 | 9/2014 | Field-Darragh | |
| 2014/0288987 A1 | 9/2014 | Liu | |
| 2014/0310047 A1 | 10/2014 | De | |
| 2014/0310051 A1 | 10/2014 | Meng | |
| 2014/0350997 A1 | 11/2014 | Holm | |
| 2014/0364987 A1 | 12/2014 | Shikano | |
| 2015/0006448 A1 | 1/2015 | Gupta | |
| 2015/0007058 A1 | 1/2015 | Wooten | |
| 2015/0012330 A1 | 1/2015 | Sugiura | |
| 2015/0052437 A1 | 2/2015 | Crawford | |
| 2015/0058053 A1 | 2/2015 | De | |
| 2015/0113540 A1 | 4/2015 | Rabinovici | |
| 2015/0134393 A1 | 5/2015 | De | |
| 2015/0153906 A1 | 6/2015 | Liao | |
| 2015/0213411 A1 | 7/2015 | Swanson | |
| 2015/0215256 A1 | 7/2015 | Ghafourifar | |
| 2015/0262111 A1 | 9/2015 | Yu | |
| 2015/0312375 A1 | 10/2015 | Valey | |
| 2015/0317595 A1 | 11/2015 | De | |
| 2015/0339006 A1 | 11/2015 | Chaland | |
| 2015/0363092 A1 | 12/2015 | Morton | |
| 2015/0363733 A1 | 12/2015 | Brown | |
| 2015/0379472 A1 | 12/2015 | Gilmour | |
| 2016/0012368 A1 | 1/2016 | O'Connell | |
| 2016/0048408 A1 | 2/2016 | Madhu | |
| 2016/0048786 A1 | 2/2016 | Fukuda | |
| 2016/0063192 A1 | 3/2016 | Johnson | |
| 2016/0063449 A1 | 3/2016 | Duggan | |
| 2016/0072750 A1 | 3/2016 | Kass | |
| 2016/0110670 A1 | 4/2016 | Chatterjee | |
| 2016/0124775 A1 | 5/2016 | Ashtiani | |
| 2016/0140474 A1 | 5/2016 | Vekker | |
| 2016/0140501 A1 | 5/2016 | Figlin | |
| 2016/0147773 A1 | 5/2016 | Smith | |
| 2016/0147846 A1 | 5/2016 | Smith | |
| 2016/0148157 A1 | 5/2016 | Walia | |
| 2016/0180277 A1 | 6/2016 | Skiba | |
| 2016/0180298 A1 | 6/2016 | McClement | |
| 2016/0182311 A1 | 6/2016 | Borna | |
| 2016/0188145 A1 | 6/2016 | Vida | |
| 2016/0216854 A1 | 7/2016 | McClellan | |
| 2016/0224939 A1 | 8/2016 | Chen | |
| 2016/0234391 A1 | 8/2016 | Wolthuis | |
| 2016/0275436 A1 | 9/2016 | Kurjanowicz | |
| 2016/0313934 A1 | 10/2016 | Isherwood | |
| 2016/0328217 A1 | 11/2016 | Hagerty | |
| 2016/0337213 A1 | 11/2016 | Deutsch | |
| 2016/0342927 A1 | 11/2016 | Reznik | |
| 2016/0350689 A1 | 12/2016 | Baek | |
| 2016/0380927 A1 | 12/2016 | Vaughn | |
| 2017/0004213 A1 | 1/2017 | Cunico | |
| 2017/0009387 A1 | 1/2017 | Ge | |
| 2017/0017364 A1 | 1/2017 | Kekki | |
| 2017/0017924 A1 | 1/2017 | Kashiwagi | |
| 2017/0034226 A1 | 2/2017 | Bostick | |
| 2017/0039503 A1 | 2/2017 | Jones | |
| 2017/0061341 A1 | 3/2017 | Haas | |
| 2017/0068933 A1 | 3/2017 | Norton | |
| 2017/0093874 A1 | 3/2017 | Uthe | |
| 2017/0099296 A1 | 4/2017 | Fisher | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0140318 A1 | 5/2017 | Platakis | |
| 2017/0153799 A1 | 6/2017 | Hoyer | |
| 2017/0154024 A1 | 6/2017 | Subramanya | |
| 2017/0177671 A1 | 6/2017 | Allgaier | |
| 2017/0185592 A1 | 6/2017 | Frei | |
| 2017/0187868 A1 * | 6/2017 | Katai | G06F 3/04817 |
| 2017/0192642 A1 | 7/2017 | Fishman | |
| 2017/0206217 A1 | 7/2017 | Deshpande | |
| 2017/0235848 A1 | 8/2017 | Van Dusen | |
| 2017/0249577 A1 | 8/2017 | Nishikawa | |
| 2017/0289073 A1 | 10/2017 | Crusson | |
| 2017/0316367 A1 | 11/2017 | Candito | |
| 2017/0317898 A1 | 11/2017 | Candito | |
| 2017/0323233 A1 | 11/2017 | Bencke | |
| 2017/0323267 A1 | 11/2017 | Baek | |
| 2017/0323350 A1 | 11/2017 | Laderer | |
| 2017/0344754 A1 | 11/2017 | Kumar | |
| 2017/0346861 A1 | 11/2017 | Pearl | |
| 2017/0351385 A1 | 12/2017 | Ertmann | |
| 2018/0032524 A1 | 2/2018 | Byron | |
| 2018/0052943 A1 | 2/2018 | Hui | |
| 2018/0053127 A1 | 2/2018 | Boileau | |
| 2018/0054720 A1 * | 2/2018 | Messenger | H04W 68/005 |
| 2018/0059910 A1 | 3/2018 | Wooten | |
| 2018/0060785 A1 | 3/2018 | Carnevale | |
| 2018/0060818 A1 | 3/2018 | Ishiyama | |
| 2018/0063063 A1 | 3/2018 | Yan | |
| 2018/0068271 A1 | 3/2018 | Abebe | |
| 2018/0075387 A1 | 3/2018 | Kulkarni | |
| 2018/0083909 A1 | 3/2018 | Barker | |
| 2018/0088754 A1 | 3/2018 | Psenka | |
| 2018/0089625 A1 | 3/2018 | Rosati | |
| 2018/0095938 A1 | 4/2018 | Monte | |
| 2018/0102989 A1 | 4/2018 | Borsutsky | |
| 2018/0131649 A1 | 5/2018 | Ma | |
| 2018/0157477 A1 | 6/2018 | Johnson | |
| 2018/0165610 A1 | 6/2018 | Dumant | |
| 2018/0173386 A1 | 6/2018 | Adika | |
| 2018/0189706 A1 | 7/2018 | Newhouse | |
| 2018/0189734 A1 | 7/2018 | Newhouse | |
| 2018/0189736 A1 | 7/2018 | Guo | |
| 2018/0205797 A1 | 7/2018 | Faulkner | |
| 2018/0225795 A1 | 8/2018 | Napoli | |
| 2018/0226069 A1 | 8/2018 | Fleischman | |
| 2018/0247352 A1 | 8/2018 | Rogers | |
| 2018/0247549 A1 | 8/2018 | Martin | |
| 2018/0255180 A1 | 9/2018 | Goldberg | |
| 2018/0260081 A1 | 9/2018 | Beaudoin | |
| 2018/0262620 A1 | 9/2018 | Wolthuis | |
| 2018/0285471 A1 | 10/2018 | Hao | |
| 2018/0295079 A1 | 10/2018 | Longo | |
| 2018/0302357 A1 * | 10/2018 | Cohen | H04L 51/212 |
| 2018/0316636 A1 | 11/2018 | Kamat | |
| 2018/0331842 A1 | 11/2018 | Faulkner | |
| 2018/0357049 A1 | 12/2018 | Epstein | |
| 2018/0367477 A1 | 12/2018 | Hariram | |
| 2018/0367483 A1 | 12/2018 | Rodriguez | |
| 2018/0373804 A1 | 12/2018 | Zhang | |
| 2019/0005048 A1 | 1/2019 | Crivello | |
| 2019/0007228 A1 | 1/2019 | Vuskovic | |
| 2019/0014070 A1 | 1/2019 | Mertvetsov | |
| 2019/0018552 A1 | 1/2019 | Bloy | |
| 2019/0034057 A1 | 1/2019 | Rudchenko | |
| 2019/0068390 A1 | 2/2019 | Gross | |
| 2019/0079909 A1 | 3/2019 | Purandare | |
| 2019/0080289 A1 | 3/2019 | Kreitler | |
| 2019/0095839 A1 | 3/2019 | Itabayashi | |
| 2019/0095846 A1 | 3/2019 | Gupta | |
| 2019/0102700 A1 | 4/2019 | Babu | |
| 2019/0138583 A1 | 5/2019 | Silk | |
| 2019/0138589 A1 | 5/2019 | Udell | |
| 2019/0138961 A1 | 5/2019 | Santiago | |
| 2019/0139004 A1 | 5/2019 | Vukovic | |

(56) References Cited

U.S. PATENT DOCUMENTS

| | | |
|---|---|---|
| 2019/0147386 A1 | 5/2019 | Balakrishna |
| 2019/0187987 A1 | 6/2019 | Fauchère |
| 2019/0213509 A1 | 7/2019 | Burleson |
| 2019/0245820 A1 | 8/2019 | Grochocki, Jr. |
| 2019/0265821 A1 | 8/2019 | Pearl |
| 2019/0288965 A1 | 9/2019 | Qiu |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342785 A1 | 11/2021 | Mann |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2023/0075835 A1 | 3/2023 | Sabo |
| 2023/0334426 A1 | 10/2023 | Morales |

FOREIGN PATENT DOCUMENTS

| | | |
|---|---|---|
| CN | 102378975 B | 5/2015 |
| CN | 103534685 B | 11/2016 |
| CN | 106228451 A | 12/2016 |
| CN | 109104587 A | 12/2018 |
| CN | 109428859 A | 3/2019 |
| WO | 2004047465 A2 | 6/2004 |
| WO | 2015036817 A1 | 3/2015 |
| WO | 2015123751 A1 | 8/2015 |
| WO | 2016068852 A1 | 5/2016 |
| WO | 2018204841 A1 | 11/2018 |
| WO | 2019079826 A1 | 4/2019 |
| WO | 2020006634 A1 | 1/2020 |

OTHER PUBLICATIONS

Jeronimo G. Grandi, "Characterizing Asymmetric Collaborative Interactions in Virtual and Augmented Realities," 2019, IEEE Conference on Virtual Reality, pp. 127-135. (Year: 2019).
Yoon-Eui Nahm, "Integrated Product and Process Modeling for Collaborative Design Environment," Mar. 2004, Concurrent Engineering: Research and Applications, pp. 5-23. (Year: 2004).
"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
"How to Asana: Inviting teammates to Asana." YouTube, Asana, Mar. 21, 2017, https://www.youtube.com/watch?v=TLOruY1KyxU ( Year: 2017), 13 pages.
"Rules of Data Conversion from Document to Relational Databases", published: 2014, publisher: Future-processing, pp. 1-8 (Year: 2014).
Tiburca, Andrew) Best Team Calendar Applications for 2018—Toggl https://toggl.com/blog/best-team-calendar-applications-for-2018 (Year: 2017) 3 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).
Assef, F., Cassius, T. S., & Maria, T. S. (2018). Confrontation between techniques of time measurement. Journal of Manufacturing Technology Management, 29(5), 789-810. (Year: 2018).
Biggs, "GateGuru Relaunches With New Ways to Streamline Your Travel Experience", Techcrunch, (Apr. 26, 2013), pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
Creating Tables with Fields from 2 Different Tables, published: 2009, publisher: StackOverflow, pp. 1-2. (Year: 2009).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Dawei Li, "Deepcham: Collaborative Edge-Mediated Adaptive Deep Learning for Mobile Object Recognition", 2016, IEEE/ACM, pp. 64-76. (Year: 2016).
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Hartmann, "TimeProjectscheduling with resource capacities and requests varying with time: a case study," 2013, Flexible services and manufacturing journal, vol. 25, No. 1, pp. 74-93 (Year: 2013).
Helen Mongan-Rallis & Terrie Shannon, "Synchronous Chat," Aug. 2016, Dept. of Education, Univ. of MN Duluth, web. archive.org/

(56) References Cited

OTHER PUBLICATIONS web/20160825183503/https://www.d.umn.edu/hrallis/professional/presentations/cotfsp06/indiv_tools/sync_chat.htm (Year: 2016) (2 pages).
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv30 (Year: 2017) (24 pages).
How to Asana, Planning with Asana calendar, youtube excerpt, Feb. 14, 2017 https://www.youtube.com/watch?v=w816KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).
How to use Advanced Search in Asana, Asana tutorial, May 25, 2016 https://www.youtube.com/watch?v=5VyJ3toPfQM (Year: 2016) (28 pages).
ip.com, A Method to Eliminate Unnecessary IM Messages, Jun. 10, 2008, IMCOM000171454D, 3 pages.
Jacob Crandall, "Validating Human Robot Interaction Schemes in Multitasking Environments," 2005, IEEE Transactions on Systems Man, and Cybernetics, Part A, Systems and Humans, vol. 35, No. 4, pp. 438-449. (Year: 2005).
Justin Rosenstein, Unveiling the Future of Asana, Mar. 28, 2018 https://www.youtube.com/watch?v=nRI?d_WM4Bc (Year: 2018) (2 pages).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
Wikipedia entry for AIM (software), archived Sep. 29, 2019, 10 pages.
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https://web.archive.org/web/20160101054527/https://asana.com/product) (Year: 2016) 15 pages.
Crescencio Bravo, "A groupware system to support collaborative programming: Design and Experiences," 2013, The Journal of Systems and Sofware, 86, pp. 1759-1771. (Year: 2013).

\* cited by examiner

SYSTEMS AND METHODS FOR GENERATING AND PRESENTING GRAPHICAL USER INTERFACES

FIELD OF THE DISCLOSURE

The present disclosure relates to systems and methods for generating and presenting graphical user interfaces corresponding to users and including portions of one or more chat sessions the users are participants in.

BACKGROUND

Chat applications and/or systems may facilitate synchronous textual communications between two or more users. Graphical user interfaces presenting chat sessions may present the textual communications sent by each user in real-time and/or near real-time. Typical graphical user interfaces present chat sessions having one or more different participants as separate windows and/or graphical user interfaces.

Group chat sessions may facilitate synchronous textual communications between a group of users. New groups with one or more different users may be created such that users often participate in multiple chat sessions with different individual other users and/or groups of users.

SUMMARY

One aspect of the present disclosure relates to a system configured for presenting graphical user interfaces corresponding to users. The graphical user interfaces may include portions of one or more chat sessions the users are participants in. The chat sessions may facilitate synchronous textual communication between the users that takes place through a chat system. The chat system may be part of the system and/or external to the claimed system. The system may include one or more hardware processors configured by machine-readable instructions. The processor(s) may be configured to obtain chat information characterizing participants in the chat sessions. The chat sessions may include a first chat session, a second chat session, and/or other chat sessions. The first chat session may facilitate synchronous textual communication between a first user, a second user, and a third user, such that first chat information characterizing the first user, the second user, and the third user as participants in the first chat session is obtained. The second chat session may facilitate synchronous textual communication between the first user and the second user such that second chat information characterizing the first user and the second user as participants in the second chat session is obtained.

Responsive to receiving user input indicating a section of the first user by the second user, the processor(s) may be configured to effectuate presentation of a first graphical user interface corresponding to the first user via a client computing platform associated with the second user. The first graphical user interface may include first stated information provided by the first user and portions of one or more chat sessions the first user is a participant in with the second user, such that the first graphical user interface displays the first stated information characterizing the first user, at least a portion of the first chat session, and at least a portion of the second chat session.

Another aspect of the present disclosure relates to a method for presenting graphical user interfaces corresponding to users and including portions of one or more chat sessions the users are participants in, the chat sessions facilitating synchronous textual communication between the users that takes place through a chat system. The method may include obtaining chat information characterizing participants in the chat sessions. The chat sessions may include a first chat session, a second chat session, a third chat session, and/or other chat sessions. The first chat session may facilitate synchronous textual communication between a first user, a second user, and a third user, such that first chat information characterizing the first user, the second user, and the third user as participants in the first chat session is obtained. The second chat session may facilitate synchronous textual communication between the first user and the second user such that second chat information characterizing the first user and the second user as participants in the second chat session may be obtained.

The method may include effectuating presentation of a first graphical user interface corresponding to the first user via a client computing platform associated with the second user. The graphical user interfaces may correspond to individual ones of the selected users and individual ones of the selecting users. For example, the first graphical user interface corresponding to the first user may be presented via the client computing platform associated with the second user responsive to receiving user input indicating a selection of the first user by the second user. The first graphical user interface may include first stated information provided by the first user, portions of one or more chat sessions the first user is a participant in with the second user, and/or other information. As such, the first graphical user interface may display the first stated information characterizing the first user, at least a portion of the first chat session, at least a portion of the second chat session, and/or other information.

In some implementations, a system configured to present graphical user interfaces corresponding to users that including portions of one or more chat sessions the users are participants in, may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a chat component, a user selection component, a unit of work component, a graphical user interface component, and/or other components.

The environment state component may be configured to manage environment state information for maintaining a collaboration environment. The environment state information may include user records, work unit records, and/or other records. The environment state information may define a state of the collaboration environment including user states, work unit states, and/or other states. The user states may be defined by the user records. The user records may define values of user parameters associated with users interacting with and/or viewing the collaboration environment. The work unit states may be defined by the work unit records that define values of work unit parameters for units of work managed, created, and/or assigned within the collaboration environment.

In some implementations, the user records may include stated information characterizing the users that is provided by the users. First stated information may include information selected by the first user that characterizes the first user. By way of example, the first stated information may include username information, title information, department information, status information, work information, and/or other information.

The chat component may be configured to obtain chat information characterizing participants in one or more chat sessions. The chat sessions may include a first chat session, a second chat session, and/or other chat sessions. The chat sessions may facilitate synchronous textual communication between two or more users. By way of example, a first chat session may facilitate synchronous textual communication between the first user, a second user, and/or a third user. Chat information characterizing the first user, the second user, and/or the third user as participants in the first chat session may be obtained. By way of another example, a second chat session may facilitate textual communication between the first user and the second user. As such, second chat information characterizing the first user and the second user as participants in the second chat session may be obtained.

The user selection component may be configured to receive user input indicating selection of one or more users by one or more other users. A given user may select another user to view a graphical user interface corresponding to the other user. The graphical user interface corresponding to the other user may include information associated with one or both of the given user and the other user. For example, information associated with both the given user and the other user may include portions of one or more chat sessions the given user is a participant in with the other user, one or more units of work both the given user and the other user are associated with, and/or other information. The user selection component may be configured to receive user input indicating a selection of the first user by the second user. User input indicating selection of the first user by the second user may be received from a client computing platform associated with the second user. In some implementations, the user selection component may be configured to receive and/or execute search queries for one or more users.

The unit of work component may be configured to identify one or more units of work associated with the first user based on the work unit records and/or the user records.

The graphical user interface component may be configured to effectuate presentation of a first graphical user interface corresponding to the first user. Presentation of the first graphical user interface may be effectuated responsive to the user selection component receiving selection of the first user by the second user. The first graphical user interface may be presented via a client computing platform associated with the second user. The graphical user interface may include first stated information provided by the first user, portions of one or more chat sessions the first user is a participant in with the second user, and/or other information. As such, for example, the first graphical user interface may display the first data information characterizing the first user, at least a portion of the first chat session, at least a portion of the second chat session, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
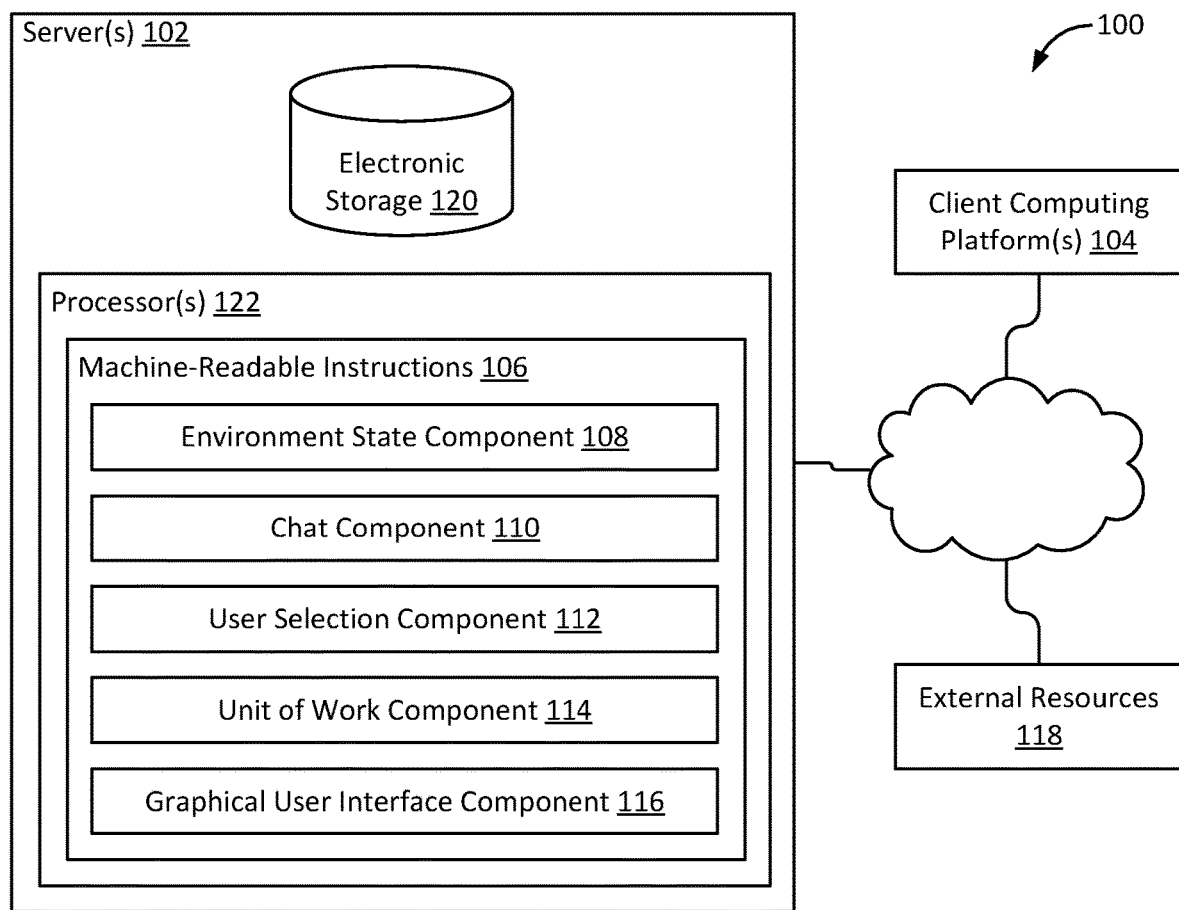
FIG. 1 shows a system configured for generating and presenting graphical user interfaces corresponding to users and including portions of one or more chat sessions the users are participants in, the chat sessions facilitating synchronous textual communication between the users that takes place through a chat system, in accordance with one or more implementations.

FIG. 1 illustrates a system 100 configured for presenting graphical user interfaces corresponding to users and including portions of one or more chat sessions the users are participants in, the chat sessions facilitating synchronous textual communication between the users that takes place through a chat system, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of an environment state component 108, chat component 110, user selection component 112, unit of work component 114, graphical user interface component 116, and/or other instruction components.

Environment state component 108 may be configured to manage environment state information to maintain a collaboration environment. The environment state information may include user records and work unit records. The environment state information may define a state of the collaboration environment including user states, work unit states, and/or other states. The user states may be defined by the user records that define values of user parameters associated with users interacting with and/or viewing the collaboration environment. Individual ones of the user records may correspond to individual ones of the users. The work unit states may be defined by the work unit records that define values of work unit parameters for units of work managed, created, and/or assigned within the collaboration environment. Individual ones of the work unit records may correspond to individual ones of the units of work and/or be associated with one or more users and/or other units of work.

The environment state information may include user records, work unit records, and/or other records. The environment state information may be continuously generated and/or updated based on the state of the collaboration environment representing the users' interactions with the collaboration environment. The state of the collaboration environment may include a user state, a work unit state, and/or other states. The user state may be defined by the user records. The user records may define values of user parameters associated with users interacting with and/or viewing the collaboration environment. The work unit state may be defined by the work unit records. The work unit records may define values of work unit parameters for units of work managed, created, and/or assigned within the collaboration environment. In some implementations, the work unit state may include a project state, a task state, a sub-task state, and/or other states. The work unit records may include project records, task records, sub-task records, and/or other records.

The work unit parameters for work units managed, created, and/or assigned within the collaboration environment may include parameters describing one or more work units managed, created, and/or assigned within the collaboration environment and/or via the collaboration work management platform, and/or the metadata associated with the one or more work units. Individual ones of the work units may be associated with individual ones of the work unit records. A work unit record may define values of the work unit parameters associated with a given work unit managed, created, and/or assigned within the collaboration environment and/or via the collaboration work management platform. A given work unit may have one or more owners and/or one or more team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given work unit may include one or more projects, tasks, sub-tasks, and/or other units of work possibly assigned to and/or associated with one or more users.

The work unit parameters may, by way of non-limiting example, include one or more of: one or more units of work, one or more user comment parameters (e.g., a creator, a recipient, one or more followers, one or more other interested parties, content, one or more times, up-votes, other hard-coded responses, etc.), a work unit name, a work unit description, one or more work unit dates (e.g., a start date, a due date, a completion date, and/or other work unit dates), one or more members associated with a unit of work (e.g., an owner, one or more other project/task members, member access information, and/or other work unit members and/or member information), a status and/or progress (e.g., an update, a hardcoded status update, a measured status, quantity of work units remaining in a given project, completed work units in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, sub-tasks within a task, etc.,), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), other work unit parameters for the given work units, and/or other work unit parameters, and/or user parameters for one or more users and/or work units the given project is associated with.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a group parameter, a subset parameter, a user account, a user role, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other work unit order, etc.), one or more authorized applications, one or more presence/interaction parameters (e.g., indicating presence and/or interaction level at an environment level, work unit level, project level, task level, application level, etc.), one or more notification settings, one or more progress parameters, status information for one or more work units the user is associated with, one or more statistics related to a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, other user parameters for the given user, and/or other user parameters and/or work unit parameters, for one or more work units the given user is associated with.

Chat component 110 may be configured to obtain chat information characterizing participants in the chat sessions. Chat sessions may include synchronous and/or semi-synchronous textual conversations between two or more users via a chat system and/or a chat interface. In some implementations, the chat sessions may facilitate textual communication and/or non-textual communication between two or more users. For example, audio communication, video communication and/or other types of communication may be facilitated by the chat sessions. The chat information may include user information characterizing the participants in the chat sessions, text information representing the textual communications exchanged during the chat sessions, time information indicating a date and/or time the textual communications were exchanged, natural language processing information characterizing the audio and/or video communications that occurred during the chat sessions, and/or other information. Chat component 110 may be configured to perform natural language processing of any audio and/or video communications that occur during the chat sessions to generate natural language processing information.

The chat sessions may include a first chat session, a second chat session, a third chat session, a fourth session, a fifth chat session, and/or any other chat session. By way of non-limiting example, the first chat session may facilitate synchronous textual communication between a first user, a second user, and a third user. As such, the first chat information may characterize the first user, the second user, and the third user as participants in the first chat session is. The first chat information may be obtained by chat component 110. The first chat information may be obtained by chat component 110 so it may be included in graphical user interfaces corresponding to the first user, the second user, and/or the third user, responsive to the first user, the second user, and/or the third user selecting one of the first user, the second user, and/or the third user. The second chat session may facilitate synchronous textual communication between the first user and the second user such that second chat information characterizing the first user and the second user as participants in the second chat session is obtained.

In some implementations, chat component 110 may be configured to implement an instance of a chat session to facilitate the synchronous communication between the users within the collaboration environment. Implementing instances of the chat sessions may include transmitting the textual communications that make up the chat sessions to the client computing platforms for presentation through graphical chat interfaces. In some implementations, chat component 110 may be configured to receive and/or obtain chat information from a chat system external to the collaboration environment. By way of non-limiting example, a chat system external to the collaboration environment may integrate with and/or communicate with the collaboration environment via an Application Program Interface (API).

User selection component 112 may be configured to receive user input indicating selection of one or more users. The one or more users may be selected by one or more other users. A given user may select another user to view a graphical user interface corresponding to the other user and the given user. The graphical user interface corresponding to the other user may include information associated with both the given user and the other user. The information associated with both the given user and the other user may include portions of one or more chat sessions the given user is a participant in with the other user, one or more units of work both the given user and the other user are associated with, and/or other information. User selection component 112 may be configured to receive user input indicating a selection of the first user by the second user. User input indicating selection of the first user by the second user may be received from a client computing platform associated with the second user.

In some implementations, user selection component 112 may be configured to receive and/or execute search queries for one or more users. Responsive to receiving a search query, user selection component 112 may identify one or more users corresponding to the search query and initiate presentation of results for the search query. The results for the search query may include one or more users matching the search query. User selection component 112 may be configured to receive user input indicating selection of a user from the results for the search query.

In some implementations, unit of work component 114 may be configured to identify one or more of the units of work associated with the selected users and/or the selecting users. Units of work associated with one or more users may include units of work one or more users assigned to another user, are working on, assigned to, responsible for, overseeing, managing, and/or otherwise associated with. For example, units of work associated with both the selected user and the selecting user unit of work component 114 may be configured to identify one or more units of work associated with the first user based on the work unit records and/or the user records. By way of another example, unit of work component 114 may be configured to identify the one or more units of work that are associated with both the first user and the second user. A unit of work associated with both the first user and the second user may include a unit of work assigned to the first user by the second user, a unit of work the first user is responsible for completing and the second user is overseeing, a unit of work assigned to both the first user and the second user, a unit of work for a team both the first user and the second user are a part of, and/or other configurations. Work information corresponding to the units of work identified by unit of work component 114 may be included in the graphical user interfaces for individual ones of the users.

Graphical user interface component 116 may be configured to effectuate presentation of a graphical user interface corresponding to the user selected via the user input. The graphical user interfaces corresponding to the users may include stated information provided by the users, portions of one or more chat sessions the selected users and the selecting users (that selected to view the GUIs associated with the selected users) are participants in, and/or other information. In some implementations, graphical user interface component 116 may be configured to effectuate presentation of a first graphical user interface responsive to receiving user input indicating selection of the first user by the second user. The first graphical user interface corresponding to the first user may be presented via a client computing platform associated with the second user responsive to the second user selecting the first user. The first graphical user interface may represent chat sessions and/or units of work the first user and the second user have in common and/or share.

By way of non-limiting example, the first graphical user interface (provided in response to the second user selecting to view the GUI associated with the first user) may include first stated information provided by the first user, portions of one or more chat sessions the first user is a participant in with the second user, and/or other information. As such, the first graphical user interface may display the first stated information characterizing the first user, at least a portion of the first chat session, and at least a portion of the second chat session.

Stated information may include information inputted and/or selected by the users that characterizes the users and/or will be included in the graphical user interfaces associated with the users. The first stated information may include information selected and/or input by the first user that characterizes the first user. By way of non-limiting example, the first stated information may include username information, title information, department information, status information, personal information, and/or other information. A user may write, select, and/or determine what stated information is included in their graphical user interface regardless of the selecting user viewing their graphical user interface.

In some implementations, effectuating presentation of the graphical user interfaces corresponding to the users may include presenting work information for the one or more units of work identified by unit of work component 114 as being associated with the selected user and/or the selecting user. By way of non-limiting example, effectuating presentation of the first graphical user interface may include presenting work information for the one or more units of work identified as being associated with both the first user and the second user (that selected the first user), or presenting work information for the one or more units of work identified as being associated with only the first user.

Graphical user interface component 116 may be configured to effectuate presentation of a second graphical user interface corresponding to the second user. Presentation of the second graphical user interface may be effectuated responsive to receiving user input indicating selection of the second user by the first user. The second graphical user interface may be presented via a client computing platform associated with the first user. By way of non-limiting example, the second graphical user interface may include second stated information provided by the second user, portions of one or more chat sessions the second user is a participant in with the first user, and/or other information. As such, the second graphical user interface may display the second stated information, at least a portion of the first chat session, at least a portion of the second chat session, and/or other information. The graphical user interfaces may display portions of the chat sessions both the selected user and the selecting user are participants in. In some implementations, the graphical user interfaces may display portions of group chat sessions between other users in addition to the selected user and the selecting user.

Graphical user interface component 116 may be configured to effectuate presentation of a third graphical user interface corresponding to the third user responsive to receiving user input indicating a selection of the third user by the second user. The third graphical user interface corresponding to the third user may be presented via a client computing platform associated with the second user responsive to user selection component 112 receiving user input from the second user indicating a selection of the third user. The third graphical user interface may include third stated information provided by the third user, portions of one or more chat sessions the third user is a participant in with the second user, and/or other information. As such, the third graphical user interface may display the third stated information, at least a portion of the first chat session (between the first user, the second user, and the third user), and/or other information.

The portions of the one or more chat session displayed via one or more graphical user interfaces may include text information representing one or more of the communications input by an individual ones of the participants. For example, the portion of the first chat session displayed by the first graphical user interface may include one or more of the communications input by the first user, one or more communications input by the second user, and/or one or more communications input by the third user. Inputting communications may include The portion of the second chat session displayed by the first graphical user interface may include one or more of the communications input by the first user and/or one or more the communications input by the second user.

Figure 2:
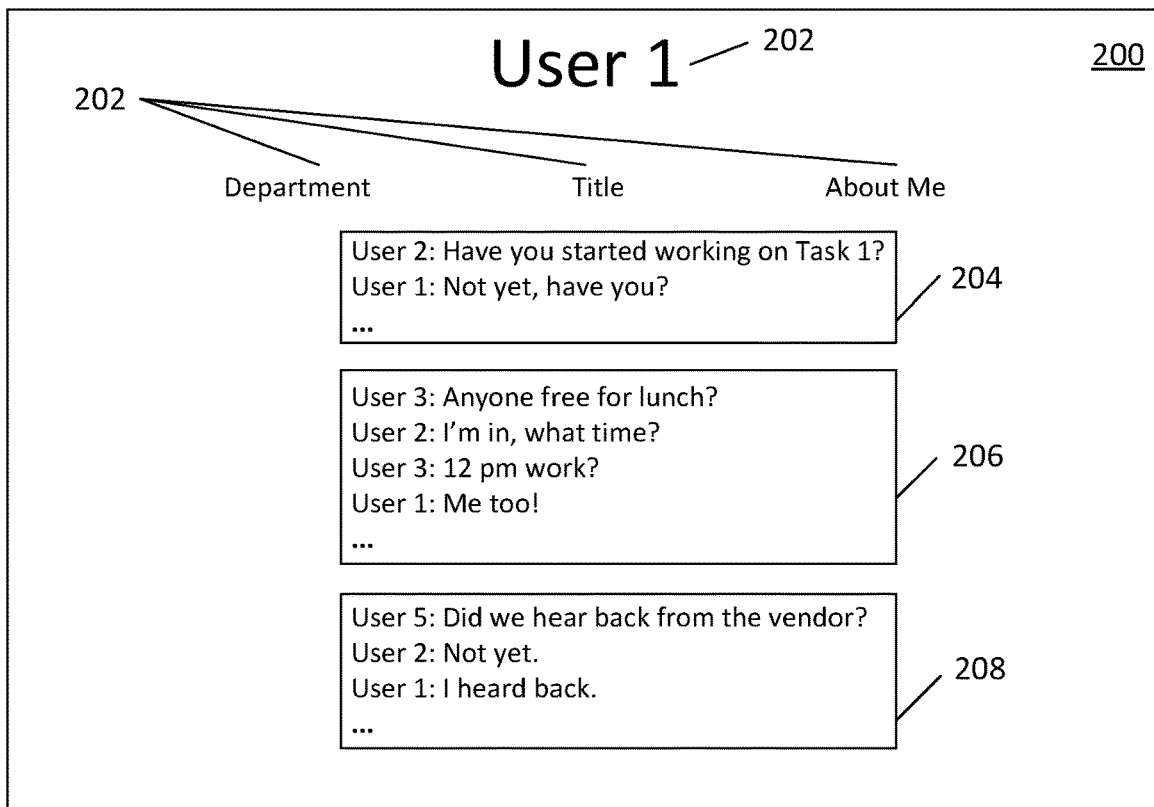
FIG. 2 illustrates a graphical user interface corresponding to user 1 and including portions of one or more chat sessions user 1 and user 2 are participants in, in accordance with one or more implementations.

FIG. 2 illustrates a graphical user interface corresponding to user 1 and including portions of one or more chat sessions user 1 and user 2 are participants in, in accordance with one or more implementations. Graphical user interface 200 may correspond to User 1. User 2 may select User 1 to view graphical user interface 200. Graphical user interface 200 may include stated information 202. Stated information 202 may include a username (e.g., "User 1"), a department, a title (e.g., a job title), an about me section, and/or other information provided by and/or input by User 1. Graphical user interface 200 may include a portion of chat session 204, a portion of chat session 206, a portion of chat session 208, and/or other portions of other chat sessions User 1 and User 2 are participants in. User 1 and User 2 may be participants in chat session 204. User 1, User 2, and User 3 may be participants in chat session 206. User 1, User 2, and User 5 may participants in chat session 208. All of the chat sessions displayed via graphical user interface 200 may include at least User 1 and User 2 as participants responsive to User 2 selecting to view graphical user interface 200 corresponding to User 1.

Figure 3:
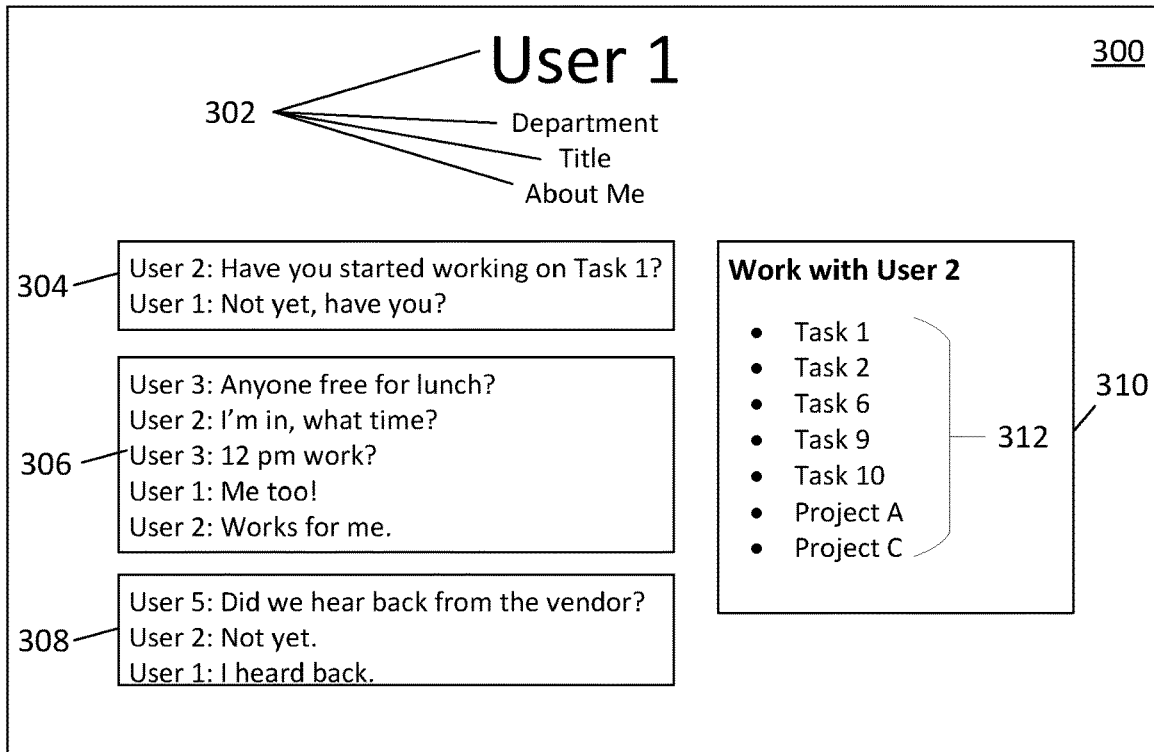
FIG. 3 illustrates a graphical user interface corresponding to user 1 and including portions of one or more chat sessions user 1 and user 2 are participants in, in accordance with one or more implementations.

FIG. 3 illustrates a graphical user interface corresponding to user 1 and including portions of one or more chat sessions user 1 and user 2 are participants in, in accordance with one or more implementations. Graphical user interface 300 may correspond to User 1. User 2 may select User 1 to view graphical user interface 300. Graphical user interface 300 may include stated information 302. Stated information 302 may include a username (e.g., "User 1"), a department, a title (e.g., a job title), an about me section, and/or other information provided by and/or input by User 1. Graphical user interface 300 may include a portion of chat session 304, a portion of chat session 306, a portion of chat session 308, and/or other portions of other chat sessions User 1 and User 2 are participants in. User 1 and User 2 may be participants in chat session 304. User 1, User 2, and User 3 may be participants in chat session 306. User 1, User 2, and User 5 may participants in chat session 308. All of the chat sessions displayed via graphical user interface 300 may include at least User 1 and User 2 as participants responsive to User 2 selecting to view graphical user interface 300 corresponding to User 1.

Graphical user interface 300 may include work information 310 for units of work 302. Work information 310 may comprise titles for units of work 302 both User 1 and User 2 are associated with. User 1 and User 2 may both be working on, assigned to, and/or associated with units of work 312. By way of example, User 2 may be the project manager for Project A and Project C (which User 1 is associated with). By way of another example, User 2 may have assigned one or more of Task 1, Task 2, Task 6, Task 9, and Task 10 to User 1.

Returning to FIG. 1, in some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program components. The computer program components may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute components 108, 110, 112, 114, and/or 116, and/or other components. Processor(s) 122 may be configured to execute components 108, 110, 112, 114, and/or 116, and/or other components by software; hardware; firmware; some combination of software, hardware, and/or firmware; and/or other mechanisms for configuring processing capabilities on processor(s) 122. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 122 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 122 may be configured to execute one or more additional components that may perform some or all of the functionality attributed below to one of components 108, 110, 112, 114, and/or 116.

Figure 4:
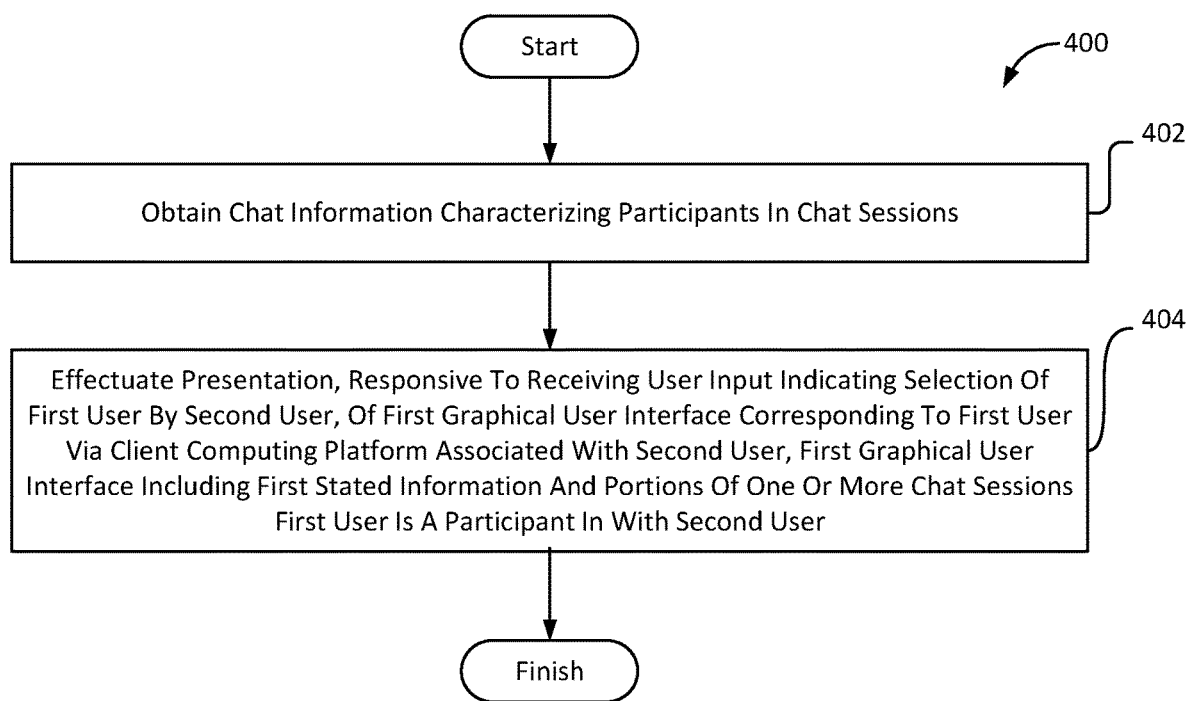
FIG. 4 includes a flow chart of a method for generating and presenting graphical user interfaces corresponding to users and including portions of one or more chat sessions the users are participants in, the chat sessions facilitating synchronous textual communication between the users that takes place through a chat system, in accordance with one or more implementations.

FIG. 4 illustrates a method 400 for presenting graphical user interfaces corresponding to users and including portions of one or more chat sessions the users are participants in, the chat sessions facilitating synchronous textual communication between the users that takes place through a chat system, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining chat information characterizing participants in the chat sessions. The chat sessions may include a first chat session and a second chat session. The first chat session may facilitate synchronous textual communication between a first user, a second user, and a third user, such that first chat information characterizing the first user, the second user, and the third user as participants in the first chat session is obtained. The second chat session may facilitate synchronous textual communication between the first user and the second user such that second chat information characterizing the first user and the second user as participants in the second chat session is obtained. Operation 402 may be performed by one or more hardware processors configured by machine-readable instructions including a component that is the same as or similar to chat component 110, in accordance with one or more implementations.

An operation 404 may include effectuating presentation, responsive to receiving user input indicating a selection of the first user by the second user, of a first graphical user interface corresponding to the first user via a client computing platform associated with the second user. The first graphical user interface may include first stated information provided by the first user and portions of one or more chat sessions the first user is a participant in with the second user. As such, the first graphical user interface may display the first stated information characterizing the first user, at least a portion of the first chat session, and at least a portion of the second chat session. Operation 404 may be performed by one or more hardware processors configured by machine-readable instructions including a component that is the same as or similar to graphical user interface component 116, in accordance with one or more implementations.

Figure 5:
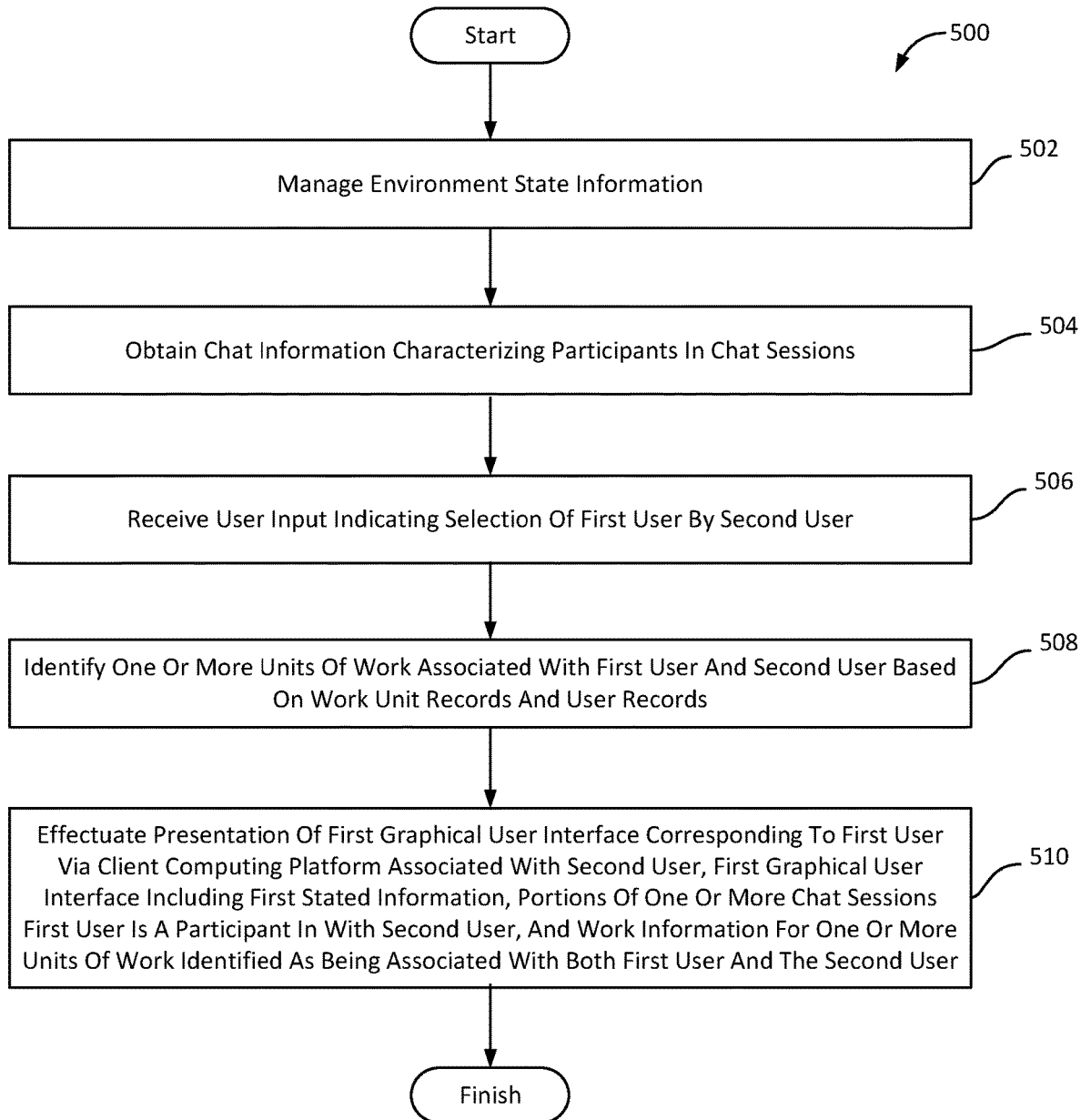
FIG. 5 includes a flow chart of a method for generating and presenting graphical user interfaces corresponding to users and including portions of one or more chat sessions the users are participants in, the chat sessions facilitating synchronous textual communication between the users that takes place through a chat system, in accordance with one or more implementations.

FIG. 5 illustrates a method 500 for presenting graphical user interfaces corresponding to users and including portions of one or more chat sessions the users are participants in, the chat sessions facilitating synchronous textual communication between the users that takes place through a chat system, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include managing environment state information for maintaining a collaboration environment. The environment state information may include user records, work unit records, and/or other records. The environment state information may define a state of the collaboration environment including user states, a work unit state, and/or other states. The user states may be defined by the user records that define values of user parameters associated with users interacting with and/or viewing the collaboration environment. The work unit states may be defined by the work unit records that define values of work unit parameters for units of work managed, created, and/or assigned within the collaboration environment. Operation 502 may be performed by one or more hardware processors configured by machine-readable instructions including a component that is the same as or similar to environment state component 108, in accordance with one or more implementations.

Operation 504 may include obtaining chat information characterizing participants in the chat sessions. The chat sessions may include a first chat session and a second chat session. The first chat session may facilitate synchronous textual communication between a first user, a second user, and a third user, such that first chat information characterizing the first user, the second user, and the third user as participants in the first chat session is obtained. The second chat session may facilitate synchronous textual communication between the first user and the second user such that second chat information characterizing the first user and the second user as participants in the second chat session is obtained. Operation 504 may be performed by one or more hardware processors configured by machine-readable instructions including a component that is the same as or similar to chat component 110, in accordance with one or more implementations.

Operation 506 may include receiving user input indicating selection of a first user by the second user. Operation 506 may be performed by one or more hardware processors configured by machine-readable instructions including a component that is the same as or similar to user selection component 112, in accordance with one or more implementations.

Operation 508 may include identifying one or more units of work associated with the first user. The one or more units of work associated with the first user may be identified based on the work unit records and/or the user records. Operation 508 may be performed by one or more hardware processors configured by machine-readable instructions including a component that is the same as or similar to unit of work component 114, in accordance with one or more implementations.

An operation 510 may include effectuating presentation, responsive to receiving user input indicating a selection of the first user by the second user, of a first graphical user interface corresponding to the first user via a client computing platform associated with the second user. The first graphical user interface may include first stated information provided by the first user, portions of one or more chat sessions the first user is a participant in with the second user, and work information for the one or more units of work identified as being associated with the first user. As such, the first graphical user interface may display the first stated information characterizing the first user, at least a portion of the first chat session, at least a portion of the second chat session, and work information for the one or more units of work identified as being associated with the first user. Operation 510 may be performed by one or more hardware processors configured by machine-readable instructions including a component that is the same as or similar to graphical user interface component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a graphical user interface, the system comprising:
   one or more hardware processors configured by machine-readable instructions to:

generate user interface information defining a graphical user interface configured to display content of multiple different communication sessions, the graphical user interface corresponding to a set of users who were participants in the multiple different communication sessions, the graphical user interface being separate and distinct from graphical user interfaces through which the multiple different communication sessions were carried out, such that the graphical user interface displays first content from one of the multiple different communication sessions, and second content from an other one of the multiple different communication sessions.

2. The system of claim 1, wherein a communication session of the multiple different communication sessions includes textual content.

3. The system of claim 1, wherein a communication session of the multiple different communication sessions includes non-textual content.

4. The system of claim 1, wherein the first content includes a first communication provided by a first user in the set of users.

5. The system of claim 4, wherein the first content further includes a second communication provided by a second user in the set of users.

6. The system of claim 1, wherein the one or more hardware processors are further configured by the machine-readable instructions to:
effectuate communication of the user interface information to a computing platform associated with a user in the set of users to cause the computing platform to present the graphical user interface.

7. The system of claim 1, wherein one or more hardware processors configured by the machine-readable instructions to:
obtain user input information conveying user input by a user into a computing platform, the user input including selection of an other user; and
generate the user interface information in response to the user input.

8. The system of claim 7, wherein the user and the other user are included in the set of users.

9. The system of claim 8, wherein the first content and second content include content input by users in the set of users.

10. The system of claim 9, wherein the content input by the users in the set of users are distinguishable by user based on presentation of usernames.

11. A method to provide a graphical user interface, the method being implemented in a computer system comprising one or more hardware processors configured by machine-readable instructions, such that execution of the machine-readable instructions by the one or more hardware processors causes the one or more hardware processors to perform the method comprising:
generating user interface information defining a graphical user interface configured to display content of multiple different communication sessions, the graphical user interface corresponding to a set of users who were participants in the multiple different communication sessions, the graphical user interface being separate and distinct from graphical user interfaces through which the multiple different communication sessions were carried out, such that the graphical user interface displays first content from one of the multiple different communication sessions, and second content from an other one of the multiple different communication sessions.

12. The method of claim 11, wherein a communication session of the multiple different communication sessions includes textual content.

13. The method of claim 11, wherein a communication session of the multiple different communication sessions includes non-textual content.

14. The method of claim 11, wherein the first content includes a first communication provided by a first user in the set of users.

15. The method of claim 14, wherein the first content further includes a second communication provided by a second user in the set of users.

16. The method of claim 11, further comprising:
effectuating communication of the user interface information to a computing platform associated with a user in the set of users to cause the computing platform to present the graphical user interface.

17. The method of claim 11, further comprising:
obtaining user input information conveying user input by a user into a computing platform, the user input including selection of an other user; and
generating the user interface information in response to the user input.

18. The method of claim 17, wherein the user and the other user are included in the set of users.

19. The method of claim 18, wherein the first content and the second content include content input by users in the set of users.

20. The method of claim 19, wherein the content input by the users in the set of users are distinguishable by user based on presentation of usernames.

* * * * *